(12) United States Patent
Miyazaki et al.

(10) Patent No.: US 6,810,122 B1
(45) Date of Patent: Oct. 26, 2004

(54) SECRET SHARING SYSTEM AND STORAGE MEDIUM

(75) Inventors: Shingo Miyazaki, Yokohama (JP); Kouichi Sakurai, Fukuoka (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/488,006

(22) Filed: Jan. 20, 2000

(30) Foreign Application Priority Data

Jul. 23, 1999 (JP) .......................................... 11-209891

(51) Int. Cl.[7] ............................. H04K 3/00; H04K 1/00; H04L 9/00; G06F 17/60
(52) U.S. Cl. ........................... 380/30; 380/42; 380/277; 380/283; 380/285; 380/286
(58) Field of Search ........................... 380/42, 283, 30, 380/285, 286, 277; 705/71, 57, 80

(56) References Cited

U.S. PATENT DOCUMENTS 5,625,692 A * 4/1997 Herzberg et al. ............ 380/286
6,026,163 A * 2/2000 Micali ......................... 705/80
6,237,097 B1 * 5/2001 Frankel et al. ............... 713/180

OTHER PUBLICATIONS

Douglas R. Stinson, Cryptography Theory and Practice, 1995, CRC Press, 1st edition, p. 159–160.*
Adi Shamir, How to Share a Secret, Nov. 1979, ACM, vol. 22 No. 11, pp. 612–613.*
Y. Frankel et al., "Robust Efficient Distributed RSA–Key Generation", Proceedings of the Thirtieth Annual ACM Symposium on Theory Computing pp. 663–672, 1998.
Y. Frankel et al., "Optimal–Resilience Proactive Public–Key Cryptosystems", 38th Annual Symposium on Foundations of Computer Science, pp. 384–393, 1997.
T. Okamoto, "Threshold Key–Recovery Systems for RSA", Security Protocols, LNCS 1361, pp. 191–200, 1997.
D. Boneh et al., "Efficient Generation of Shares RSA Keys", Advances in Cryptology–CRYPTO'97 LNCS 1294, pp. 425–439, 1997.
S. R. Blackburn et al., "Efficient Multiplicative Sharing Schemes", Advances in Cryptology–EUROCRPY'96, LNCS 1070 pp. 107–118, 1996.
T. P. Pedersen et al., "A Threshold Cryptosystem without a Trusted Party", Advances in Cryptology–EUROCRYPT'91, LNCS 547, pp. 522–526, 1991.
S. Miyazaki, I. Kuroda, K. Sakurai, "Extension to Decentralized Structure in International Key Depository System," Technology Research Report of the Institute of Electronics, Information and Communication Engineers, the Institute of Electronics, Information and Communication Engineers, vol. 98, No. 227, pp. 53–60, Jul. 30, 1998.

\* cited by examiner

*Primary Examiner*—Kim Vu
*Assistant Examiner*—Allen Wu
(74) *Attorney, Agent, or Firm*—Finnegan, Henderson, Farabow, Garrett & Dunner, L.L.P.

(57) ABSTRACT

A secret sharing system and a storage medium where each of the n shareholders P1 to Pn holds a (n, n) share di ($0 \leq i \leq n$), turns the share di into t(r+1) partial random numbers Sj of the (t, n) type, shares r+1 partial random numbers Sj to the respective shareholders P1 to Pn on the basis of a t-ary representation (value k at the $t^i$-th digit, $0 \leq k \leq t-1$, $0 \leq j \leq r$) of the identification number z of each of the shareholders Pi, and puts together the shared partial random numbers for each digit $t^i$ in the t-ary representation to obtain r+1 shares $d_{j,k}$. Then, the user unit U selects t shareholders $T_z$ and transmits encrypted data C to the selected t shareholders $T_z$. The t shareholders Tz perform an operation on the encrypted data C on the basis of the share $d_{j,k}$ to obtain partial outputs $X_z$ and return the partial outputs $X_z$ to the user unit U. Then, the user unit U combines the t partial outputs $X_z$ to obtain the result of decryption.

18 Claims, 7 Drawing Sheets

|  | $X=\infty$ | $X=0$ | $X=1$ | $X=2$ |
|---|---|---|---|---|
| $f_1$ | $d_{0,0}$ | $d_{1,0}$ | $d_{2,0}$ | $d_{3,0}$ |
| $f_2$ | $d_{0,0}$ | $d_{1,1}$ | $d_{2,1}$ | $d_{3,1}$ |
| $f_3$ | $d_{0,0}$ | $d_{1,2}$ | $d_{2,2}$ | $d_{3,2}$ |
| $f_4$ | $d_{0,1}$ | $d_{1,0}$ | $d_{2,1}$ | $d_{3,2}$ |
| $f_5$ | $d_{0,1}$ | $d_{1,1}$ | $d_{2,2}$ | $d_{3,0}$ |
| $f_6$ | $d_{0,1}$ | $d_{1,2}$ | $d_{2,0}$ | $d_{3,1}$ |
| $f_7$ | $d_{0,2}$ | $d_{1,0}$ | $d_{2,2}$ | $d_{3,1}$ |
| $f_8$ | $d_{0,2}$ | $d_{1,1}$ | $d_{2,0}$ | $d_{3,2}$ |
| $f_9$ | $d_{0,2}$ | $d_{1,2}$ | $d_{2,1}$ | $d_{3,0}$ |
FIG. 1
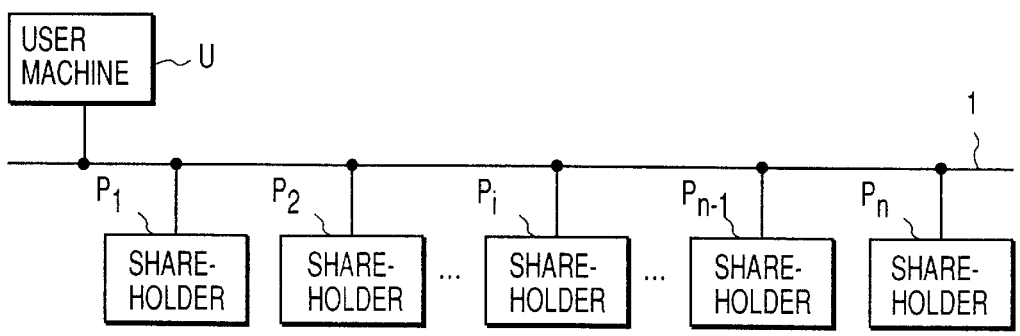
FIG. 3
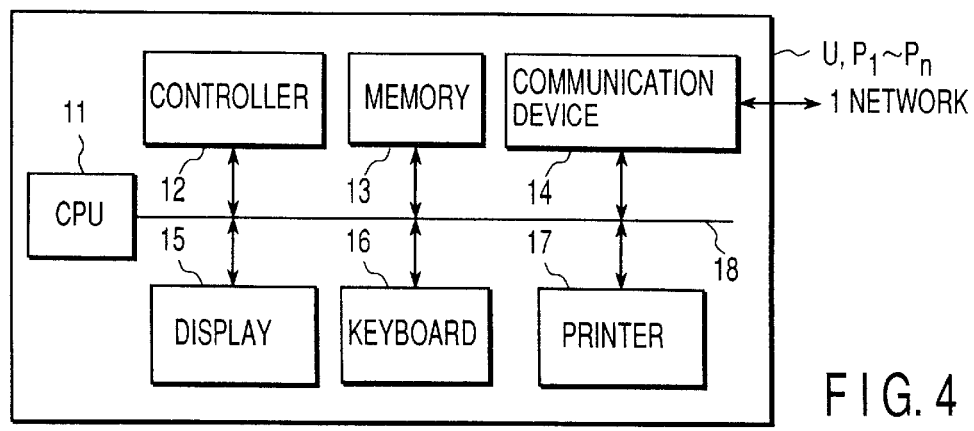
FIG. 4

|   | X=∞ |   | X=0 |   | X=1 |   | X=2 |
|---|---|---|---|---|---|---|---|
| a | 1,4,7 | b | 1,2,3 | b | 1,2,3 | b | 1,2,3 |
|   | 1,4,8 |   | 1,2,6 |   | 1,2,5 |   | 1,2,4 |
|   | 1,4,9 |   | 1,2,9 |   | 1,2,7 |   | 1,2,8 |
|   | 1,5,7 |   | 1,5,3 |   | 1,4,3 |   | 1,6,3 |
|   | 1,5,8 |   | 1,5,6 |   | 1,4,5 |   | 1,6,4 |
| c | 1,5,9 | c | 1,5,9 | a | 1,4,7 | d | 1,6,8 |
|   | 1,6,7 |   | 1,8,3 |   | 1,9,3 |   | 1,7,3 |
| d | 1,6,8 | d | 1,8,6 | c | 1,9,5 | a | 1,7,4 |
|   | 1,6,9 |   | 1,8,9 |   | 1,9,7 |   | 1,7,8 |
|   | 2,4,7 |   | 4,2,3 |   | 6,2,3 |   | 5,2,3 |
|   | 2,4,8 |   | 4,2,6 |   | 6,2,5 |   | 5,2,4 |
| e | 2,4,9 | e | 4,2,9 | f | 6,2,7 | g | 5,2,8 |
|   | 2,5,7 |   | 4,5,3 |   | 6,4,3 |   | 5,6,3 |
| g | 2,5,8 | h | 4,5,6 | h | 6,4,5 | h | 5,6,4 |
|   | 2,5,9 |   | 4,5,9 |   | 6,4,7 |   | 5,6,8 |
| f | 2,6,7 | i | 4,8,3 | j | 6,9,3 | k | 5,7,3 |
|   | 2,6,8 |   | 4,8,6 |   | 6,9,5 |   | 5,7,4 |
|   | 2,6,9 |   | 4,8,9 |   | 6,9,7 |   | 5,7,8 |
|   | 3,4,7 |   | 7,2,3 |   | 8,2,3 |   | 9,2,3 |
| i | 3,4,8 | f | 7,2,6 | g | 8,2,5 | e | 9,2,4 |
|   | 3,4,9 |   | 7,2,9 |   | 8,2,7 |   | 9,2,8 |
| k | 3,5,7 | k | 7,5,3 | i | 8,4,3 | j | 9,6,3 |
|   | 3,5,8 |   | 7,5,6 |   | 8,4,5 |   | 9,6,4 |
|   | 3,5,9 |   | 7,5,9 |   | 8,4,7 |   | 9,6,8 |
|   | 3,6,7 |   | 7,8,3 |   | 8,9,3 |   | 9,7,3 |
|   | 3,6,8 |   | 7,8,6 |   | 8,9,5 |   | 9,7,4 |
| j | 3,6,9 | l | 7,8,9 | l | 8,9,7 | l | 9,7,8 |

FIG. 2

| | PRESENCE OF DEALER | ABSENCE OF DEALER |
|---|---|---|
| [t, n] - KEY RECOVERY | • [Ped 91a]<br>• [Oka 97] | • [FMY 98] |
| [t, n] - DECRYPTION/ SIGNATURE | • [Ped 91a]<br>• [FGMY 97]<br>• [Ped 91a] + PRESENT INVENTION (MODIFICATION 2)<br>• DEALER MODEL + PRESENT INVENTION (MODIFICATION 1) | • [BBDW 96]<br>• [BF 97]<br>• [FMY 98]<br>• [BF 97] + PRESENT INVENTION (1ST EMBODIMENT)<br>• [FMY 98] + PRESENT INVENTION (2ND EMBODIMENT) |

SECRET SHARING SYSTEM AND STORAGE MEDIUM

BACKGROUND OF THE INVENTION

This invention relates to a secret sharing system and a storage medium for a crypto system based on the problem of factorization into prime factors, and more particularly to a crypto system and a storage device which shares a secret key secretly to n shareholders and enable t of the n shareholders to perform shared decryption and signature without computing the secret key.

One known crypto system based on the problem of factorization into prime factors is a secret sharing scheme called a threshold scheme in the field of secret sharing using, for example, an RSA crypto system. The threshold scheme has a secret information recovery characteristic with a threshold of t as a boundary line. The secret information recovery characteristic is such that, when secret information is shared into n share, the secret information is recovered completely from t out of the n share but cannot be recovered at all from t−1 share (where 1<t<n).

One known secret sharing scheme of this type is a (t, n) secret sharing scheme where the concept of the threshold scheme has been introduced into the RSA crypto system and a secret key has been shared secretly in the (t, n) type (Y. Frankel, P. Gemmell, P. D. MacKenzie and M. Yung, "Optimal-resilience proactive public-key cryptosystems," 38$^{th}$ Annual Symposium on Foundations of Computer Science, pp. 384–393, 1997, which is hereinafter referred to as reference [FGMY97]), and T. Okamoto, "Threshold key-recovery systems for RSA," Security Protocols, LNCS 1361, pp. 191–200, 1997, which is hereinafter referred as reference [Oka97]).

Reference [FGMY97] has described a method of enabling any t shareholders to perform decryption and signature without computing a secret key d in an environment where dealers (distributors) exist. That is, it is a method of enabling a secret key d capable of decryption and signature to be created from any t share even if shareholders do not know prime factors of composite number N.

On the other hand, in an environment where no dealer exists, one known secret sharing scheme is a (n, n) secret sharing scheme, not a threshold scheme. In the (n, n) secret sharing scheme, all the shareholders create a key where nobody knows the secret(D. Boneh and M. Franklin, "Efficient generation of shared RSA keys," Advances in Cryptology-CRYPTO '97, LNCS 1294, pp. 425–439, 1997, which is hereinafter referred to as reference [BF97]).

In the scheme of reference [BF97], when a key is generated, (n, n) secret sharing is performed simultaneously. In addition, by combining the partial outputs from all the shareholders using the held share, the ciphertext can be decrypted without computing the secret key d.

In reference [BF97], a method of constructing (2, n) secret sharing (n≧3) from (2, 2) secret sharing has been described as shown in the following algorithm.

To simplify explanation, it is assumed that a user knows a secret key d and the user performs (2, n) secret sharing of the secret key d. It is also assumed that the number of secret sharing polynomials expressing combinations of share is r+1 where r=⌈log n⌋ for the total number of shareholders P being n (in the present specification, ⌈ ⌋ means that the smallest integer equal to or larger than the value in the parentheses).

To perform the (2, 2) secret sharing r+1 times, the user creates r+1 independent polynomials $d = d_{0,0} + d_{0,1} = d_{1,0} + d_{1,1} = \ldots = d_{r,0} + d_{r,1}$ separately.

Next, it is assumed that the identification number of each shareholder in a total of n shareholders is z (z∈[0, n]) and a binary representation of identification number z is $z(2) = \beta_r \beta_{r-1} \ldots \beta_0$. The user takes all the 0-th to n-th shareholders $P_0$ to $P_n$ into account and sends r+1 share $\{d_r, \beta_r, d_{r-1}, \beta_{r-1}, \ldots, d_0, \beta_0\}$ to the z-th shareholder $P_z$.

As a result, a set of shares corresponding to a binary representation of identification number z is sent to all the shareholders $P_0$ to $P_n$.

When the number of an shareholder is set uniquely after the set has been sent, any two shareholders Pi, Pj (i≠j) can recover the secret key d ($d_{i,0} + d_{i,1} = d$) from the shares ($d_{i,0}$, $d_{i,1}$) in the same digit differing in bit β at number z(2) of the r+1 share of (2, 2).

Next, related techniques for expanding the type of secret sharing as the method of constructing the (2, n) secret sharing from the (2, 2) one will be explained.

One of the techniques of this type is a (t, 1$^m$) secret sharing scheme using the (t, 1) type (S. R. Blackburm, M. Burmester, Y. Desmedt and P. R. Wild, "Efficient multiplicative sharing schemes," Advances in Cryptology-EUROCRYPT '96, pp. 107–118, 1996, which is hereinafter referred to as reference [BBDW96]). The scheme of reference [BBDW96] is related to 1 that satisfies the following equation (1) for a positive integer m.

$$1 \geq \binom{t}{2}(m-1) \qquad (1)$$

$$\text{if } b = \binom{t}{2}(m-1)$$

then $t=2\ b \geq 1 \to \geq 1$ $t=3\ b \geq 3 \to 1 \geq 3$ $t=4\ b \geq 6 \to 1 \geq 6$ When t≧4, then t<1. Specifically, when t≧4, it is impossible to construct a (t, n) secret sharing scheme using the (t, t) type.

For this reason, a (3, 3$^2$) secret sharing scheme using the (3, 3) type in reference [BBDW96] will be explained hereinafter. Let m=2, l=3, and t=3, and calculate b using equation (2).

$$b = \binom{t}{2}(m-1) = 3 \qquad (2)$$

First, (3, 3) secret sharing is performed b+1=4 times and four independent polynomials for the secret key d using equations (3) are formulated:

$d=d0,0+d0,1+d0,2$ (fist time)=$d1,0+d1,1+d1,2$ (second time)=$d2,0+d2,1+d2,2$ (third time)=$d3,0+d3,1+d3,2$ (fourth time)  (3)

In addition, let $f(x) = a_0 + a_1 X \pmod 3$.

In reference [BBDW96], if a set of the final shareholders (in this case, 3$^2$ shareholders) is P', f(X) is expressed by equation (4) (the first line on page 113, "d" in the equation is replaced with "m", in the present specification).

$$f(x) = \sum_{i=0}^{d-1} a_i X^i \in P' \quad (4)$$

Equation (4), however, is mistaken for the following equation (5).

$$f(x) = \sum_{i=0}^{d-1} a_i X^i (\bmod l) \quad (5)$$

where $a_0$, $a_1 \in F3$ and $f(\infty)=a_1$.

$f1(x)=0 \pmod 3$ $f2(x)=1 \pmod 3$ $f3(x)=2 \pmod 3$ $f4(x)=0+X \pmod 3$ $f5(x)=1+X \pmod 3$ $f6(x)=2+X \pmod 3$ $f7(x)=0+2X \pmod 3$ $f8(x)=1+2X \pmod 3$ $f9(x)=2+2X \pmod 3$ Each shareholder fj has $(d_0, f_j(\infty), d_1, f_j(0), d_2, f_{j(1)}, d_3, f_{j(2)})$. FIG. 1 concretely shows the sets of shares held in the individual shareholders. FIG. 2 shows combinations of shareholders and relevant share.

As shown in FIG. 1, for example when shareholders f1, f4, and f8 (second row) perform shared decryption, they extract the share corresponding to $X=\infty$. Each of them can compute the output corresponding to the secret key d by doing calculations using $(d_{0,0}, d_{0,1}, d_{0,2})$.

In FIG. 2, a combination with one of the alphabetic characters a to l means that there are three types of computation routes for the output corresponding to the secret key d in the same combination in each shareholder (in FIG. 2, "d" is merely an alphabetic character, not the secret key d). For example, in the combination (f1, f2, f3) with character b, it is possible to collect three shares to recover the secret key d using any of X=0, 1, and 2.

In connection with the (n, n) secret sharing scheme in reference [BF97], there is a scheme that has introduced the concept of threshold scheme (Y. Frankel, P. D. MacKenzie and M. Yung, "Robust efficient shared RSA-key generation," Proceedings of the thirtieth annual ACM symposium on theory of computing, pp. 663–672, 1998, which is hereinafter referred to as [FMY98]).

In the scheme of reference [FMY98], a (t, n) key generation and sharing scheme based on the (n, n) secret sharing in reference [BF97] has been described. Specifically, (n, n) key generation is performed and then the sum of polynomials for the secret key d is obtained. Then, each shareholder Pi becomes a dealer for share di and performs Sum-to-Poly conversion (conversion of sum into polynomials). At this time, each shareholder Pi combines the pieces of shared information for the partial information dj from all the shareholder Pj and finally performs secret sharing of the secret key d, thereby realizing the (t, n) secret sharing of the secret key d.

As a result, in the scheme of reference [FMY98], any t shareholders P out of a total of n shareholders can compute the RSA secret key d and therefore recover the key.

The above-described secret sharing systems, however, have the following problems.

In the scheme of reference [BBDW96], since it is impossible to construct $(t, l^m)$ secret sharing when $n > 3^2$ for t=3 and when $t \geq 4$, a method of constructing (2, n) secret sharing has not been generalized.

In the scheme of reference [FMY98], the secret key d has not been computed and a problem has arisen in performing signature or decryption using the secret key d. For example, it is assumed that there is a ciphertext $C=M^e \pmod N$ encrypted using the public key (e, N). When any t shareholders (let a set of these shareholders be $\Lambda$) decrypt the ciphertext C, each shareholder Pj must calculate Lagrange's interpolation coefficient $\lambda_{j,\Lambda}$ as shown in equation (6) and determine each partial output from the interpolation coefficient $\lambda_{j,\Lambda}$.

$$\lambda_{j,\Lambda} = \prod_{l \in \Lambda \setminus \{j\}} \frac{l}{l-j} (\bmod \phi(N)) \quad (6)$$

However, since none of the shareholders know primary factors of composite number N (=pq), they cannot compute the multiplicative inverse elements of 1−j with the order $\phi$ (N) of the width as modulus and therefore cannot compute Lagrange's interpolation coefficient $\lambda_{j,\Lambda}$. Consequently, they cannot perform shared decryption to recover the plaintext by combining partial outputs as shown in equation (7).

$$\prod_{j \in \Lambda} C^{j \cdot \lambda_{j,\Lambda}} = C^d = M (\bmod N) \quad (7)$$

BRIEF SUMMARY OF THE INVENTION

It is, accordingly, an object of the present invention to provide a (t, n) secret sharing system and a storage medium which enable any t out of n shareholders to perform shared decryption and signature without computing a secret key in an environment where no dealer exists.

According to a first aspect of the present invention, there is provided a (t, n) secret sharing system which is used for a crypto system based on the problem of factorization into prime factors and, when partial final information about a secret key is shared to n shareholders and any of the n shareholders cannot calculate the secret key from its own partial final information, enables any t shareholders out of the n shareholders to create the result of decryption and the result of signature without computing the secret key.

According to a second aspect of the present invention, there is provided a (t, n) secret sharing system which is applied to an RSA crypto system using a public key and a secret key d and which includes n shareholders connected to each other via a network and a user unit and, when partial final information about the secret key d is shared to n shareholders, enables any t shareholders out of the n shareholders to create at least either the result of decryption or the result of signature without computing the secret key d, wherein each of the n shareholders comprises means for creating the public key and the secret key d, means for holding a piece of (n, n) share di ($0 \leq i \leq n$) created on the basis of the secret key d, means for, if the smallest integer equal to or larger than the logarithm of n to the base t is r, turning the share di into t(r+1) partial random numbers of the (t, n) type and sharing r+1 out of the t(r+1) partial random numbers to the respective shareholders on the basis of a t-ary representation (value k at the $t^j$-th digit, $0 \leq k \leq t-1$, $0 \leq j \leq r$)

of the identification number of each of the shareholders, means for putting together n(r+1) partial random numbers shared by the shareholders for each digit $t^j$ in the t-ary representation and obtaining r+1 pieces of partial final information $d_{j,k}$, means for performing an operation on the data to be processed received from the user unit on the basis of the partial final information $d_{j,k}$ and returning the obtained partial output to the user unit, and the user unit comprises means for selecting the t shareholders and transmitting data to be processed to the selected t shareholders, and means for combining the partial outputs received from the t shareholders and obtaining the result of decryption or the result of signature.

According to a third aspect of the present invention, there is provided a (t, n) secret sharing system which is applied to an RSA crypto system (the greatest common divisor of e and $L^2$ is 1 and modulus N is common) using a first public key (e, N), a secret key d, and a second public key ($L^2$, N) and which includes n shareholders connected to each other via a network and a user unit and, when share sj about the secret key d is shared to n shareholders, enables any t shareholders out of the n shareholders to create the result of decryption without computing the secret key d, wherein each of the n shareholders comprises means for performing an operation on data C2 (=$M^e$ (mod N)) to be decrypted received from the user unit to produce a partial output Zj and returning the partial output Zj to the user unit, and the user unit comprises means for selecting t shareholders out of the n shareholders and transmitting the data C2 to be decrypted to the selected t shareholders, means for combining the partial outputs Zj received from the t shareholders to obtain the result of decryption C1 (=$M^{L^2}$ (mod N) where ^ represents power), and means for performing an operation on the basis of the result of decryption C1, the data to be decrypted C2, and the following equations to determine the result of final decryption M:

$$a1 = (L^2)^{-1} \pmod{e}$$

$$a2 = (a1L^2 - 1)/e$$

$$M = C_1^{a1} (C_2^{a2})^{-1} \pmod{N}$$

According to a fourth aspect of the present invention, there is provided a (t, n) secret sharing system which is applied to an RSA crypto system (the greatest common divisor of e and $L^2$ is 1, modulus N is common, and L=(n-1)!) using a first public key (e, N), a secret key d, and a second public key ($L^2$, N) and which includes n shareholders connected to each other via a network and a user unit and, when share sj about the secret key d is shared to n shareholders, enables any t shareholders out of the n shareholders to create the result of signature without computing the secret key d, wherein each of the n shareholders comprises means for performing an operation on data S2 (=M) to be signed received from the user unit to produce a partial output Zj and returning the partial output Zj to the user unit, and the user unit comprises means for selecting t shareholders out of the n shareholders and transmitting the data S2 (=M) to be signed to the selected t shareholders, means for combining the partial outputs Zj received from the t shareholders to obtain the result of signature S1 (=$M^{dL^2}$ (mod N) where ^ represents power), and means for performing an operation on the basis of the result of signature S1 (=$(M^d)^e$), the data to be signed S2 (=$(M^d)^{L^2}$), and the following equations to determine the result of final signature $M^d$:

$$a1 = (L^2)^{-1} \pmod{e}$$

$$a2 = (a1L^2 - 1)/e$$

$$M^d = S_1^{a1} (S_2^{a2})^{-1} \pmod{N}$$

With the configurations according to the first and second aspects of the present invention, each of the n shareholders creates the public key and the secret key d and holds a piece of (n, n) share di ($0 \leq i \leq n$) created on the basis of the secret key d. If the smallest integer equal to or larger than the logarithm of n to the base t is r, each of the n shareholders turns the share di into t(r+1) partial random numbers of the (t, n) type, shares r+1 out of the t(r+1) partial random numbers to the respective shareholders on the basis of a t-ary representation (value k at the $t^j$-th digit, $0 \leq k \leq t-1$, $0 \leq j \leq r$) of the identification number of each of the shareholders, and puts together n(r+1) partial random numbers shared by the shareholders for each digit $t^j$ in the t-ary representation to obtain r+1 pieces of partial final information $d_{j,k}$.

Then, the user unit selects the t shareholders and transmits data to be processed to the selected t shareholders. The t shareholders perform an operation on the data to be processed received from the user unit on the basis of the partial final information $d_{j,k}$ and returns the obtained partial outputs to the user unit. Then, the user unit combines the partial outputs received from the t shareholders to obtain the result of decryption or the result of signature.

As described above, any t shareholders out of the n shareholders can perform shared decryption or signature without computing the secret key in an environment where there is no dealer. In addition, high processing efficiency can be realized without using Lagrange's interpolation.

Furthermore, with the configuration according to the third aspect of the present invention, in an RSA crypto system (the greatest common divisor of e and $L^2$ is 1 and modulus N is common) using a first public key (e, N), a secret key d, and a second public key ($L^2$, N), when share sj about the secret key d is shared to n shareholders, a user unit selects t from the n shareholders and transmits data to be decrypted C2 to the selected t shareholders. Each of the t shareholders performs an operation on data C2 (=$M^e$ (mod N)) to be decrypted received from the user unit to produce a partial output Zj and returns the partial output Zj to the user unit. The user unit combines the partial outputs Zj received from the t shareholders to obtain the result of decryption C1 (=$M^{L^2}$ (mod N)) and performs an operation on the basis of the result of decryption C1, the data to be decrypted C2, and the specific equations (a1=$(L^2)^{-1}$ (mod e), a2=$(a1L^2-1)/e$, M=$C_1^{a1}(C_2^{a2})^{-1}$ (mod N)) to determine the result of final decryption M.

As described above, any t shareholders out of the n shareholders can perform shared decryption without computing the secret key in an environment where there is no dealer. In addition, high processing efficiency can be realized on the basis of Lagrange's interpolation using a public key under specific conditions.

Still furthermore, with the configuration according to the fourth aspect of the present invention, data to be signed S2 (=M) is used in place of data C2 to be decrypted and the result of signature S1 (=$M^{dL^2}$ (mod N) where ^ represents power) is used in place of the result of decryption C1. Instead of means for determining the result of final description M, an operation is performed on the basis of the result of signature S1 (=$(M^d)^e$), the data to be signed S2 (=$(M^d)^{L^2}$), and specific equations (a1=$(L^2)^{-1}$ (mod e), a2=$(a1L^2-1)/e$, $M^d = S_1^{a1}(S_2^{a2})-1$ (mod N)) to determine the result of final signature $M^d$.

As a result, the signature process can realize a similar operation to that of the third aspect.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a table listing sets of shares held in each shareholder in a conventional scheme;

FIG. 2 is a table listing combinations of shareholders and relevant shares in the conventional scheme;

FIG. 3 schematically shows a secret sharing system according to a first embodiment of the present invention;

FIG. 4 is a block diagram showing the hardware configuration of each shareholder and a user unit in the first embodiment;

DETAILED DESCRIPTION OF THE INVENTION

Figures 5, 8:
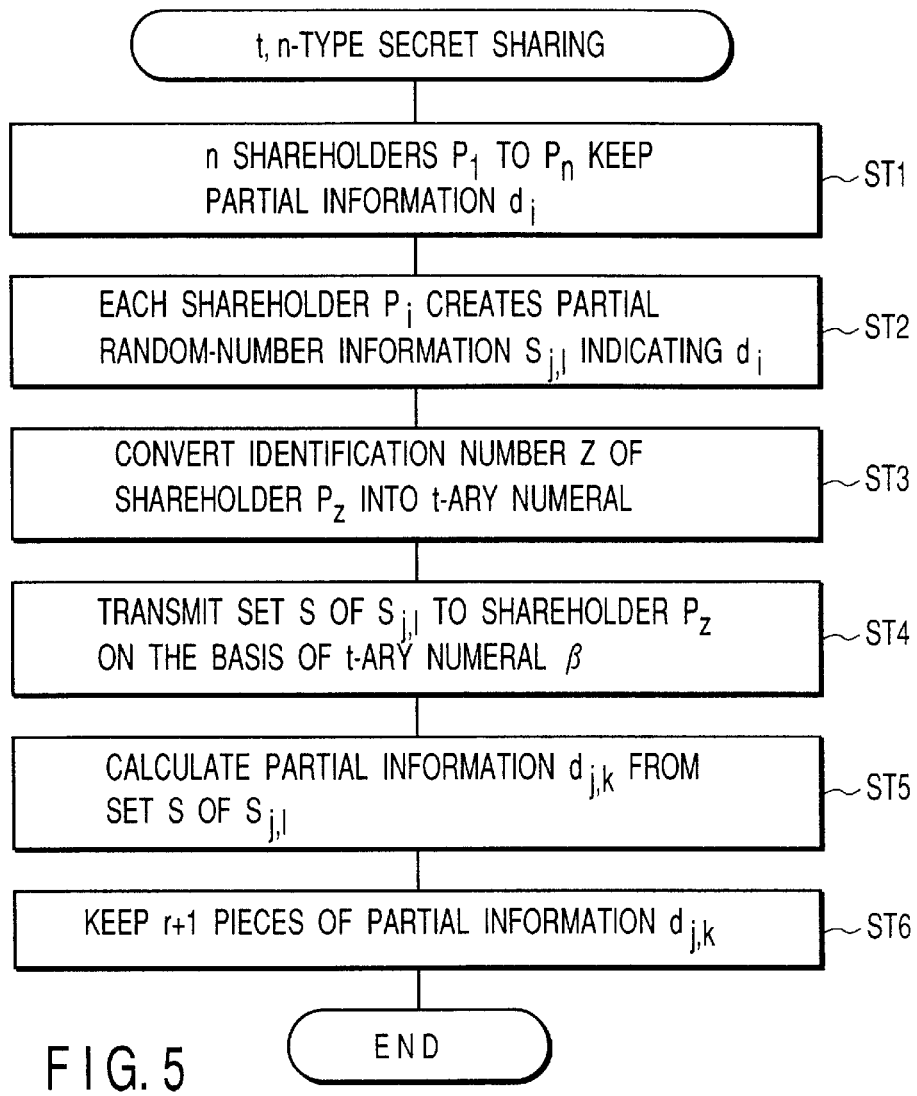
FIG. 5 is a flowchart to help explain the operation of secret sharing in the first embodiment.
FIG. 8 is a table listing pieces of information held in each shareholder to help explain a decipherable example in the first embodiment.

Referring to the accompanying drawings, embodiments of the present invention will be explained. A first embodiment of the present invention realizes high processing efficiency without using Lagrange's interpolation. A second embodiment of the present invention realizes high reliability on the basis of Lagrange's interpolation using a public key under specific conditions. Both the first and second embodiments are a (t, n) secret sharing system which enables shared decryption and signature using a non-dealer-model threshold scheme.

First Embodiment

The first embodiment of the present invention is a (t, n) secret sharing system obtained by generalizing the method of constructing a (2, n) secret sharing system from a (2, 2) one in reference [BF97].

Specifically, the first embodiment is a (t, n) secret sharing system where, when each shareholder Pi holds (n, n) share di about a secret key d, all the shareholders P1 to Pn shares di in the form of (t, n) partial random-number information, and each of the shareholders P1 to Pn puts together pieces of the partial random-number information for each digit to create partial information $d_{j,k}$.

FIG. 3 schematically shows the configuration of a secret sharing system according to the first embodiment. In the secret sharing system, n shareholders P1 to Pn each composed of computer systems and a user unit U are connected to each other via a network 1.

Since the shareholders P1 to Pn have the same configuration, an arbitrary shareholder Pi (where $1 \leq i \leq n$) will be explained as a representative example.

Shareholder Pi has the function of generating a public key (e, N) and a secret key d, the function of turning the secret key d into (2, n) share on the basis of the scheme of [BF97] and sharing r+1 pieces of the share to the shareholders P1 to Pn, the function of holding one piece of (n, n) share di on the basis of the shared r+1 shares, the function of turning into the share di into (t, n) partial random numbers and sharing r+1 of the partial random numbers to the shareholders P1 to Pn on the basis of a t-ary representation of the identification number for the shareholder, the function of putting together n(r+1) pieces of partial random numbers shared from the shareholders P1 to Pn for each digit tj in the t-ary representation and obtaining r+1 partial information $d_{j,k}$, and the function of returning to the user unit U the partial output $X_Z$ obtained by decrypting the ciphertext C received from the user unit U.

When t shareholders out of the shareholders Pi are selected, T is used in place of P in representation. For example, when shareholder $P_Z$ is selected, it is represented as shareholder $T_Z$.

The user unit U has the function of selecting t shareholders out of n shareholders P1 to Pn, the function of transmitting a ciphertext C encrypted using the public key (e, N), and the function of creating a plaintext M by combining the partial outputs $X_Z$ received from the shareholders $T_Z$.

The following is explanation of a concrete hardware configuration of the shareholders P1 to Pn and user unit U. The shareholder Pi and user unit U are a computer system in which a CPU 11, a controller 12, a memory 13, a communication device 14, a display 15, a keyboard 16, and a printer 17 are connected to each other via a bus 18 as shown in FIG. 14.

In the hardware configuration, the memory 13 includes both of a main memory (e.g., RAM) and a secondary memory (e.g., hard disk). The function the shareholder Pi is to execute is realized using the programs loaded into the main memory and the control of the CPU 11 running according to the programs. Specifically, each of the shareholders P1 to Pn and user unit U has a different software configuration to carry out the above-described functions. The details of the functions composed of hardware and software combinations will be described in explaining the operations below.

Since the shareholders P1 to Pn have only to be hardware devices for processing the data received from the user device U and returning the result to the user device U, for example, the display 15, keyboard 16, and printer 17 may be eliminated, if necessary. Similarly, in the user unit U, for example, the printer 17 may be eliminated.

The operation of the secret sharing system constructed as described above will be explained. ((t, n) secret sharing)

When the shareholders P1 to Pn generate a public key (e, N) and a secret key d, they turn the secret key d into (2, n) shares on the basis of the scheme of reference [BF97] and share r+1 out of the shares to the shareholders P1 to Pn.

The shareholders P1 to Pn secretly share different prime factors of composite number N and the secret key d in the (n, n) type on the basis of the r+1 shares in the scheme of [BF97].

Specifically, the shareholders Pi ($1 \leq i \leq n$) hold shares fulfilling the following equation (8) as shown in FIG. 5 (ST1).

$$d = d1 + d2 + \ldots + dn \tag{8}$$

Next, all the shareholders Pi function as dealers for their own shares. Specifically, all the shareholders Pi generate (t, n) partial random-number information $S_{j,l}$ ($1 \leq j \leq r$, $0 \leq l \leq t-2$) indicting their own shares di as shown in equation (9) (ST2) where $r = \lceil \log_t n \rceil$.

$$S^{(i)}_{j,t-1} = d_i - \sum_{l=0}^{t-2} S_{j,l} \tag{9}$$

The process of generating pieces of the partial random-number information $S_{j,l}$ is equivalent to the act for all the shareholders Pi to create r+1 independent polynomials representing their own shares di as shown below:

$$di = S_{0,0} + S_{0,1} + \ldots + S_{0,t-2} + S_{0,t-1}$$
$$= S_{1,0} + S_{1,1} + \ldots + S_{1,t-2} + S_{1,t-1}$$
$$= \ldots$$
$$= S_{j,0} + S_{j,1} + \ldots + S_{j,t-2} + S_{j,t-1}$$
$$= \ldots$$
$$= S_{r,0} + S_{r,1} + \ldots + S_{r,t-2} + S_{r,t-1}$$

Next, if an identification number is z, all the shareholders Pi share pieces of the partial random-number information $S_{j,l}$ among shareholders Pz ($1 \leq z \leq n$) as shown in step ST3 to step ST4 below.

Specifically, the identification number z of shareholder Pz is converted into t-ary number as shown in equation (10):

$$z = \beta_{r,z} t^r + \beta_{r-1,z} t^{r-1} + \ldots + \beta_{j,z} t^j + \ldots + \beta_{0,z} \tag{10}$$

For the sake of simplicity, equation (10) is represented as equation (11):

$$z(t) = \beta_{r,z} \beta_{r-1,z} \ldots \beta_{j,z} \ldots \beta_{0,z} \tag{11}$$

where t-ary value $\beta_{r,z} \in \{0, \ldots, t-1\}$

Each shareholder Pi transmits set S including r+1 pieces of the partial random-number information shown below to shareholder Pz on the basis of t-ary value β for each digit $t^j$ in z(t) (ST4).

$$S^{(i)}_{r,\beta r,z}, S^{(i)}_{r-1,\beta r-1,z}, \ldots, S^{(i)}_{0,\beta 0,z}$$

Each shareholder Pz calculates partial information $d_{j,k}$ by summing the pieces of the partial random-number information $S_{j,l}$ for each digit j as shown in the following equation (12) on the basis of the set S obtained from all the shareholders Pi including itself, where $k \in \{\beta_{r,z} \beta_{r-1,z} \ldots \beta_{0,z}\}$, $0 \leq j \leq r$ (ST5).

$$d_{j,k} = \sum_{i=1}^{n} S^{(i)}_{j,k} = S^{(1)}_{j,k} + S^{(2)}_{j,k} + \ldots + S^{(n)}_{j,k} \tag{12}$$

Each shareholder Pz holds r+1 partial information $d_{j,k}$ corresponding to digit j (ST6). The partial information $d_{j,k}$ is a subset of the secret key d.

The relationship between the secret key d and the partial secret key $d_{j,k}$ is as shown in equation (13):

$$d = d_{0,0} + d_{0,1} + \ldots + d_{0,t-1} \text{ ($t^0$-th digit)} = d_{1,0} + d_{1,1} + \ldots + d_{1,t-1} \text{ ($t^1$-th digit)} = (\ldots) = d_{r,0} + d_{r,1} + \ldots + d_{r,t-1} \text{ ($t^r$-th digit)} \tag{13}$$

For example, the information that the shareholder z=20 in (3, 27) secret sharing is as follows:

$$r = \lceil \log_3 27 \rceil = 3$$

$$20 = 20 = 0 \times 3^3 + 2 \times 3^2 + 0 \times 3^1 + 2 \times 3^0$$

20 (3)=0202 (ternary representation)

Therefore, shareholder $P_{20}$ holds the shares ($d_{3,0}$, $d_{2,2}$, $d_{1,0}$, $d_{0,2}$) corresponding to a ternary representation (0202) of the identification number z among all the shareholders shown in equation (14):

$$d = d_{3,0} + d_{3,1} + d_{3,2} \text{ ($3^3$-th digit)} = d_{2,0} + d_{2,1} + d_{2,2} \text{ ($3^2$-th digit)} = d_{1,0} + d_{1,1} + d_{1,2} \text{ ($3^1$-th digit)} = d_{0,0} + d_{0,1} + d_{0,2} \text{ ($3^0$-th digit)} \tag{14}$$

(Shared Decryption)

Figure 6:
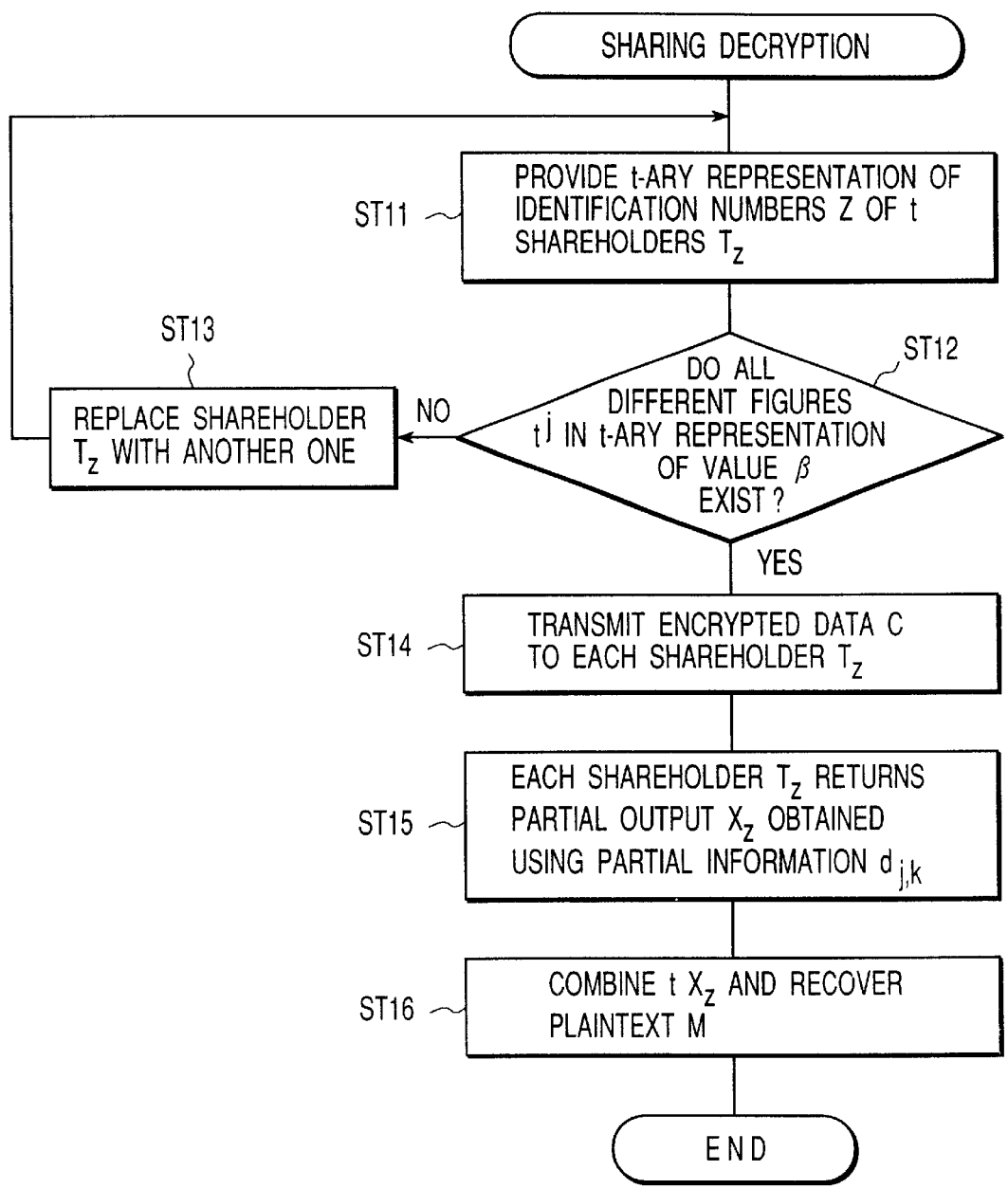
FIG. 6 is a flowchart to help explain the operation of decryption in the first embodiment.

Being requested by the user device U to perform decryption, t shareholders $T_Z$ (let this set be Λ) out of n shareholders P1 to Pn perform shared decryption of data $C = M^e$ (mod N) encrypted with the public key (e, N) of the user device U, as shown in step ST11 to step ST16 in FIG. 6.

Specifically, the user unit U converts the identification number z of each of the t shareholders $T_Z$ into t-ary representation as shown in equation (15) (ST11):

$$z(t) = \beta_{r,z} \beta_{r-1,z} \ldots \beta_{0,z} \tag{15}$$

Thereafter, the user unit U judges whether or not there is digit $t^j$ meeting the condition that value β in the t-ary representation differs ($\beta_{j,a} \neq \beta_{j,b}$) for each digit $t^j$ ($0 \leq j \leq r$) in the t-ary representation for the t shareholders Ta, Tb∈Λ (a≠b) (ST12).

When there is no digit $t^j$ meeting the condition, shared decryption using the set Λ is impossible. Thus, some of the shareholders $T_Z$ in the set Λ are replaced with others and the processes are executed again, starting from step ST11.

If there is a digit $t^j$ fulfilling the condition at step ST2, the user unit U transmits the encrypted data C to each shareholder $T_Z$ (ST14).

Each shareholder $T_Z$ (ST14) decrypts the encrypted data C on the basis of the partial information $d_{j,k}$ ($k = \beta_{j,z}$) corresponding to the $t^j$-th digit and returns the obtained partial output $X_Z$ ($= C^{d_{j,k}}$ (mod N)) to the user unit U (ST15).

The user unit combines the t partial outputs $X_Z$ (z∈Λ) received from the t shareholders $T_Z$ (z∈Λ) as shown in equation (16) and recovers a plaintext M (ST16).

$$\sum_{z \in \Lambda} = c^{d_{j,1}} c^{d_{j,2}} \ldots c^{d_{j,t}} \quad (16)$$

$$= (M^e)^{d_{j,1}+d_{j,2}+\ldots+d_{j,t}}$$

$$= (M^e)^d$$

$$= M^{(\text{mod } N)}$$

Figures 7, 9:
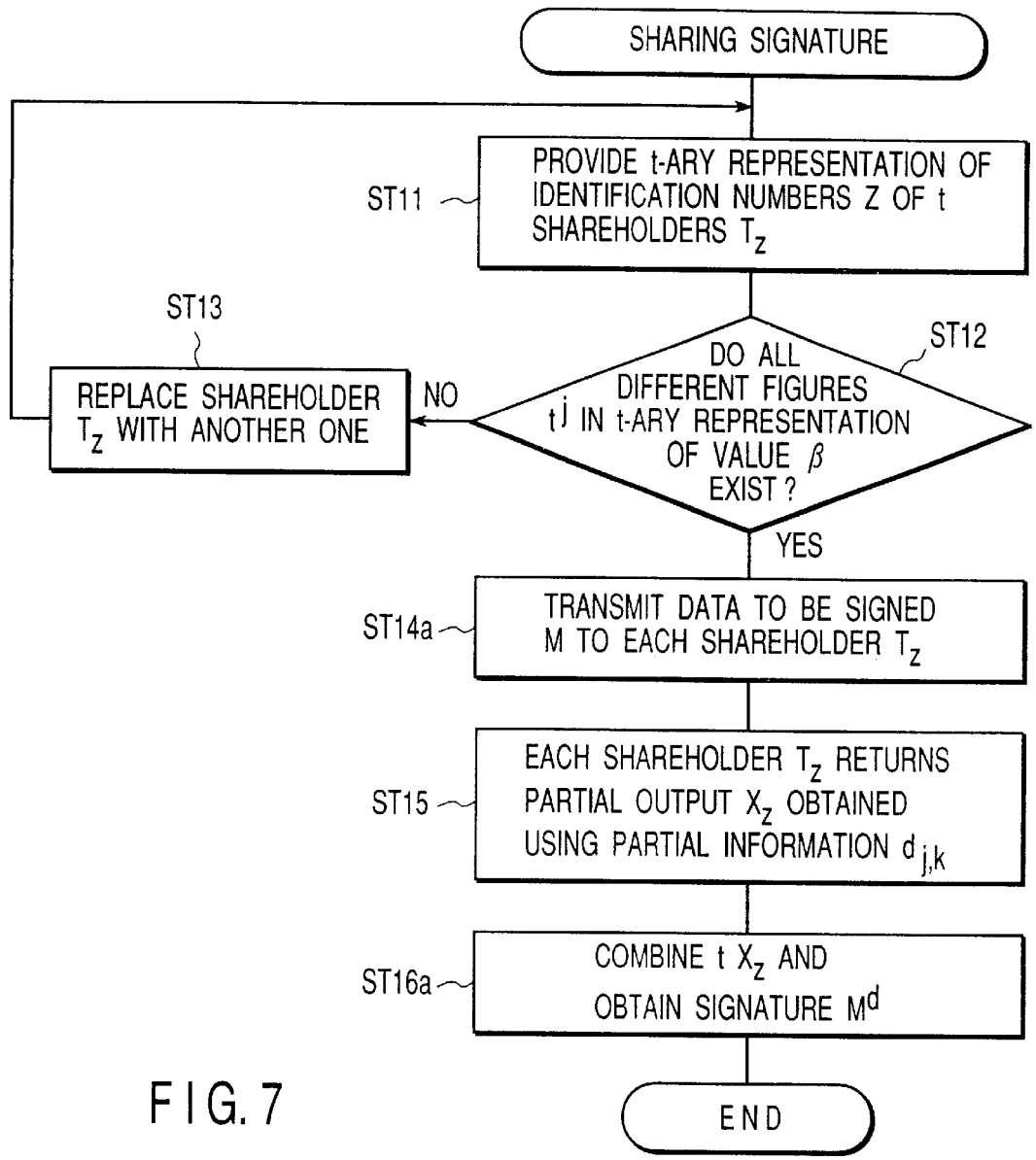
FIG. 7 is a flowchart to help explain the operation of signature in the first embodiment.
FIG. 9 is a table listing pieces of information held in each shareholder to help explain an indecipherable example in the first embodiment.

The above operations are carried out when the plaintext M is subjected to shared decryption by sending the encrypted data C (=$M^e$ (mod N)) to the t shareholders $T_Z$. The present invention is not limited to this. For instance, in the first embodiment, when data to be signed M is transmitted to the t shareholders $T_Z$ in place of the encrypted data C (ST14a), a signature $M^d$ (mod N) may be obtained by combining the aforementioned partial outputs $X_Z$ as shown in FIG. 7 (ST16a).

As described above, with the first embodiment, each of the n shareholders P1 to Pn generates a public key and a secret key d and holds a piece of (n, n) shares di ($0 \leq i \leq n$) created on the basis of the secret key d. If the smallest integer equal to or larger than the logarithm of t to the base t $\log_t n$ is r, the share di is turned into t(r+1) partial random numbers Sj of the (t, n) type. On the basis of the t-ary representation (value k at $t^j$-th digit, $0 \leq k \leq t-1$, $0 \leq j \leq r$) of the identification number z of each shareholder Pi, r+1 out of the t(r+1) random numbers Sj are shared to the shareholders P1 to Pn. The shared n(r+1) partial random numbers are put together for each $t^j$-th digit in the t-ary representation, thereby obtaining r+1 partial information $d_{j,k}$.

Then, the user unit U selects t shareholders $T_Z$ and transmits the encrypted data C (or data to be signed). The t shareholders $T_Z$ compute the encrypted data C (or data to be signed) on the basis of the partial information $d_{j,k}$ and return the obtained partial outputs $X_Z$ to the user unit U. The user unit U then combines t partial outputs $X_Z$ and obtains the result of decryption (or signature).

As described above, any t out of n shareholders can perform shared decryption and signature without computing the secret key in an environment where there is no dealer. In addition, in shared decryption, the trouble of computing Lagrange's interpolation coefficient can be omitted, which realizes high processing efficiency.

Furthermore, with the first embodiment, the input to the ciphertext can be held beforehand in the form of a table and the processing efficiency of calculations is improved more than the scheme of reference [FMY98] because Lagrange's interpolation coefficient need not be computed.

Moreover, in the first embodiment, when the Lagrange's interpolation coefficients corresponding to all the combinations are held in table form, the amount of information held can be reduced more than the scheme of reference [FMY98].

For example, in the scheme of reference [FMY98], shared decryption is performed using a threshold scheme on the basis of Lagrange's interpolation. In this case, the secret key d is not a mere sum of the shares the shareholders P1 to Pn have. Each shareholder Pj must compute the Lagrange's interpolation coefficient $\lambda_{j,\Lambda}$ and combine them. Therefore, when the interpolation coefficients $\lambda_{j,\Lambda}$ b are calculated beforehand and held in table form, it is necessary to calculate $n^C t$ interpolation coefficients $\lambda_{j,\Lambda}$ corresponding to all the combinations of one share and all the participating shareholders $T_Z$ and hold the results.

On the other hand, in the first embodiment, the share corresponding to the combinations of shareholders are selected from $\lceil \log_t n \rceil + 1$ shares. Thus, the number of shares held is $\lceil \log_t n \rceil + 1$, resulting in a smaller amount of information.

With the scheme of the first embodiment, shared decryption of the ciphertext might be impossible when a combination of t shareholders is bad. Supplementary explanation will be given using (3, 27) secret sharing as an example. It is assumed that the following r+1 polynomials hold for the secret key d:

$$d = d_{3,0} + d_{3,1} + d_{3,2}(3^3\text{-th digit})$$

$$= d_{2,0} + d_{2,1} + d_{2,2}(3^2\text{-th digit})$$

$$= d_{1,0} + d_{1,1} + d_{1,2}(3^1\text{-th digit})$$

$$= d_{0,0} + d_{0,1} + d_{0,2}(3^0\text{-th digit})$$

First, a case where shared decryption is possible will be described. When, of 27 shareholders, shareholders $P_{20}$, $P_{23}$, and $P_{26}$ intervene in a shared decryption protocol, decryption operation $C^d = M^{ed} = M$ is successful. Here, the ternary representations of the shareholders $P_{20}$, $P_{23}$, and $P_{26}$ are $P_{20}=0202$, $P_{23}=0212$, and $P_{26}=0222$. The pieces of the information held are as shown in FIG. 8. For the $3^1$-th digit, decryption can be performed using d because of $d=d_{1,0}+d_{1,1}+d_{1,2}$ as shown in equation (17):

$$C^{d/,0} \cdot C^{d/,1} \cdot C^{d/,2} = M^{ed} \quad (17)$$

$$= M(\text{mod } N)$$

The shareholders $P_{20}$, $P_{23}$, and $P_{11}$ using P11 in place of $P_{23}$ fail to perform decryption. Specifically, ternary representations of the shareholders are as follows: $P_{20}=0202$, $P_{23}=0212$, and $P_{11}=0102$. The pieces of information held are as shown in FIG. 9.

In this case, none of the digits j have three partial information $(d_{j,0}+d_{j,1}+d_{j,2})$ constituting the secret key d. Any shares overlap (collide) with each other in two or more shareholders. The overlap of pieces of the information held might make shared decryption impossible.

In this case, another t shareholders must be selected newly.

When the total number of shareholders n is large and t or more shareholders can be selected relatively freely from the n shareholders, the (t, n) secret sharing in the first embodiment is suitable. Specifically, when decryption is impossible because the total number of shareholders n is large, t shareholders P have only to be restructured to try shared decryption protocol again.

Conversely, when total number of shareholders n is small and there is no room for shareholders P to be selected, a method of creating a relational equation corresponding to all the combinations is suitable. For example, in connection with the ElGamal crypto system, the technique for any t out of n shareholders to be able to decrypt the ciphertext encrypted using a group key has been proposed (T. P. Pedersen, "A threshold cryptosystem without a trusted party," Advances in Cryptology-Eurocrypt '91, LNCS 547, pp. 522–526, 1991, which is hereinafter referred to as reference [Ped91b]). Specifically, for any t shareholders to perform shared decryption and recover the key as in the method shown in reference [Ped91b], $_nC_t$ independent relational equations related to the secret key d have only to be created. To explain more concretely, the method is to perform shared decryption using the relevant relational equation as shown in equation (18) in the case of a certain combination (Λ):

$$d=d_{1,\Lambda}+d_{2,\Lambda}+\ldots+d_{t,\Lambda} \quad (18)$$

In the method of reference [Ped91b], however, the number of relational equations becomes enormous in proportion to the total number of shareholders n, although there is no possibility of collision. Therefore, it is desirable that independent polynomials should be suppressed to a minimum in the range where there is little possibility of collision.

Because each scheme has both advantages and disadvantages, it is desirable that whether the scheme of the first embodiment (the reorganizing scheme), the scheme of using relational equations in the scheme of the first embodiment, or the scheme of a second embodiment of the present invention (a scheme using interpolation) is used should be determined on the basis of such conditions as the total number of shareholders n, the processing efficiency, the environment where shareholders are used, or whether decryption is permitted to be impossible.

Second Embodiment

Before explanation of a second embodiment of the present invention, an RSA common modulus protocol failure on which the second embodiment is based will be described.

It is assumed that, in an RSA crypto system, a single message M is encrypted under the condition that a common modulus N and different public exponents e1 and e2 are used and this encryption produces two different ciphertexts C1 and C2. In this case, even when prime factors of a composite number N are unknown, a message M can be recovered from the two ciphertexts C1 and C2 (G. J. Simmons, "A 'weak' privacy protocol using the RSA cryptoalgorithm," Cryptologia, vol. 7, pp. 180–182, 1983, which is hereinafter referred to as reference [Sim83]).

In the scheme of reference [Sim83], the aforementioned two ciphertexts $C_1$, $C_2$ are obtained using the following equations (19) and (20):

$$C_1=M^{e1} \pmod{N} \quad (19)$$

$$C_2=M^{e2} \pmod{N} \quad (20)$$

When the greatest common divisor of the different public exponents e1, e2 is gcd (e1, e2)=1, the message M can be recovered from the two ciphertexts $C_1$, $C_2$ by carrying out the following steps STc1 to STc3 (D. R. Stinson, "CRYPTOGRAPHY: Theory and Practice," CRC Press, Inc. Boca Raton, Fla., U.S.A., 1995, which is hereinafter referred as reference [Sti95]):

(Step STc1) $a1=e1^{-1} \pmod{e2}$ (Step STc2) $a2=(a1e1-1)/e2$ (Step Stc3) $M=C_1^{a1}(C_2^{a2})^{-1} \pmod{N}$ The above processes (STc1 to STc3) are expressed as follows:

Common $(e1, e2) \rightarrow M$

As described above, in the RSA crypto system, when the specific conditions are fulfilled, there is a protocol that enables the message M to be recovered. The protocol is called an RSA common modulus protocol failure.

Now, a secret sharing system according to the second embodiment of the present invention will be explained. The second embodiment relates to a (t, n) secret sharing system which creates a public key under the condition that the RSA common modulus protocol in reference [Sim83] or [Sti95] or the like is applicable and which shares sj about the secret key d by the scheme of reference [FMY98].

The condition that the RSA common modulus protocol is applicable is equivalent to fulfilling all the following items (a) to (c):

(a) The message M is the same.

(b) Modulus N is common.

(c) The greatest common divisor of the different public exponents (e1, e2) is gcd (e1, e2)=1.

In the explanation below, the public exponents (e1, e2) are expressed as ($L^2$, e). In addition, L, which is an element of the public exponent $L^2$, may be L=(n−1)! in place of L=n!.

The user unit and shareholders are the same as those in FIGS. 3 and 4 in hardware configuration, but differ in function from the first embodiment. The following explanation centers on the differences.

The shareholders P1 to Pn will be explained using an arbitrary shareholder Pi (1≦i≦n) as a representative.

The shareholder Pi has the function of creating share (pj, qj) to modulus N on the basis of the scheme of reference [FMY98], the function of sharing those shares pj, qj to the shareholders P1 to Pn, the function of creating a public key (e, N) on the basis of (pj, qj) of each shareholder Pj, the function of obtaining (t, n) share sj from a secret key d, the function of holding the share (pj, qj) and sj, and the function of returning to the user unit U the partial output Zj obtained by decrypting the ciphertext C (=$C_2$=$M^e$ (mod N)) received from the user.

The user unit U has the function of selecting t shareholders $T_Z$ out of n shareholders, the function of transmitting the ciphertext $C_2$ (=$M^e$ (mod N)) encrypted using the public key (e, N) to the t shareholders $T_Z$, the function of combining the partial outputs Zj received from the shareholders $T_Z$ to create a ciphertext $C_1$ (=$M^{L^2}$ (mod N)), and the function of calculating a message M from the two ciphertexts ($M^{L^2}$, $M^e$) using the aforementioned RSA common modulus protocol Common ($L^2$, e)→M.

The operation of the secret sharing system constructed as described above will be explained. ((t, n) secret sharing)

Each of the shareholders turns the secret key d into (t, n) share on the basis of the scheme of reference [FMY98] and shares the corresponding pieces of the share sj to n shareholders P1 to Pn.

Specifically, each shareholder Pj creates and transmits component elements (pj, qj) to modulus N. Each shareholder Pj judges whether the composite N=(p1+p2+ . . . +pn) (q1+q2+ . . . +qn) received from another shareholder Pj is the product of different prime numbers. If the composite is the product of two different prime numbers, the shareholder Pj judges that the composite is valid and proceeds to the next step.

Each shareholder Pj creates a public key (e, N) on the basis of (pj, qj) and computes partial information dj about the secret key d that each shareholder Pj should hold (which completes the (n, n) secret sharing), where $$d=d1+d2+\ldots+dj+\ldots+dn$$

Next, each shareholder Pj converts the (n, n) type sharing method of a secret key d into the (t, n) type sharing method of the secret key d using Sum-to-Poly techniques (which completes the (t, n) secret sharing).

At this time, for t−1 random numbers $\{b1, \ldots, b_{t-1}\} \in Z$, a polynomial as shown in equation (21) is determined:

$$f(x)=d+b1x+b2x^2+\ldots+b_{t-1}x^{t-1} \quad (21)$$

The equation is a polynomial of degree k−1 using y-intercept as the secret key d and determined uniquely from k coordinate points (j, f(j)) by Lagrange's interpolation. From k−1 coordinate points, however, the equation is not determined uniquely and permits any y-intercept, which prevents the secret key d from being computed.

Each shareholder Pj uses its own identification number j ($1 \leq j \leq n$) of each of the shareholders P1 to Pn as an independent variable x, substitutes it into the above polynomial f(x), computes f(j), and obtains share sj (=f(j)) indicating the y coordinate on f(x) for each Pj.

Each shareholder Pj holds the obtained (t, n) share sj and the share (pj, qj) about prime factors of modulus N. The (n, n) partial information dj is also held but not used in the second embodiment.

Shared Decryption

Figure 10:
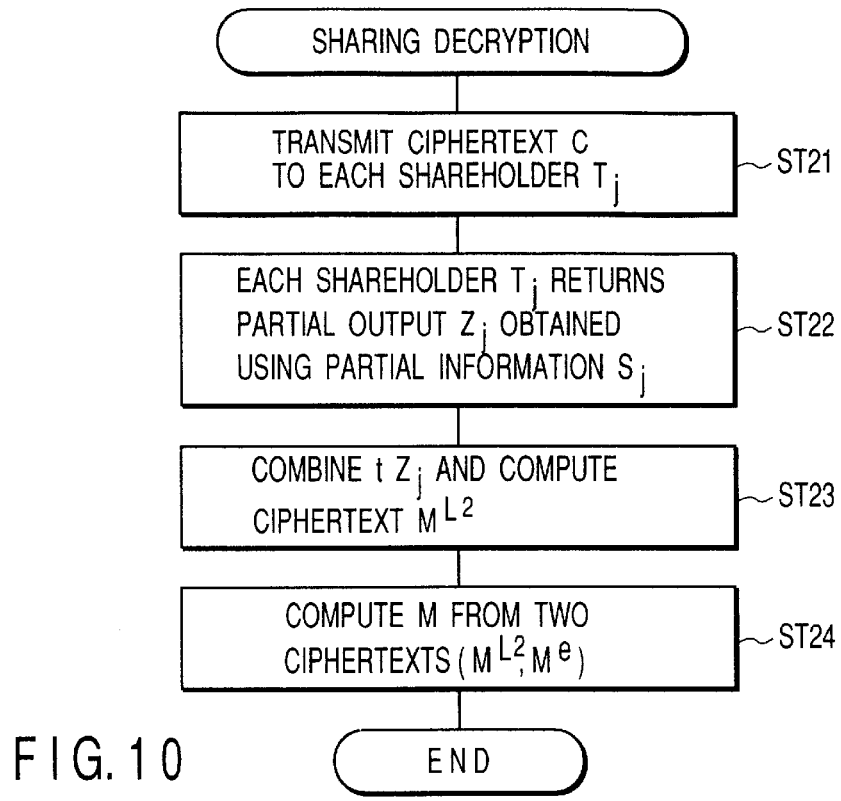
FIG. 10 is a flowchart to help explain the operation of decryption in a second embodiment of the present invention.
Figure 11:
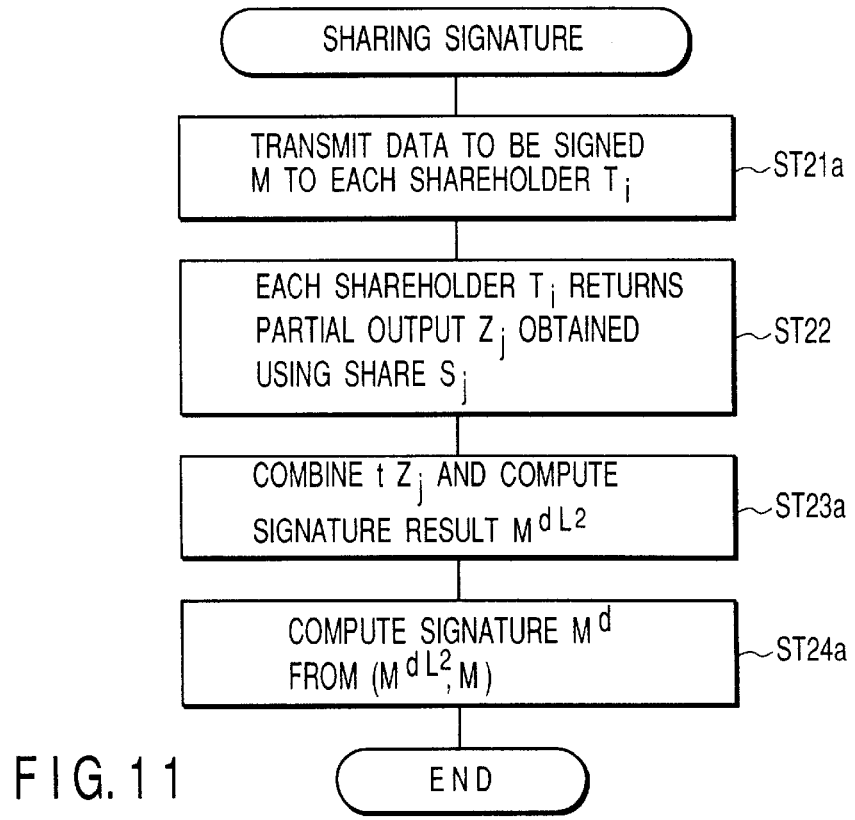
FIG. 11 is a flowchart to help explain the operation of signature in the second embodiment.

Being requested by the user device U to perform decryption, t shareholders $T_Z$ (let this set be $\Lambda$) out of n shareholders perform shared decryption of data $C = M^e$ (mod N) encrypted with the public key (e, N) of the user device U, as shown in step ST21 to step ST24 in FIG. 10. It is assumed that L=n! and the greatest common divisor gcd (e, $L^2$)=1.

Specifically, the user unit U transmits ciphertext C ($M^e$ (mod N)) to t shareholders Tj ($\in \Lambda$) (ST21).

Each shareholder Tj calculates share Zj using its own share sj and returns the obtained partial output Zj to the user unit U as shown in equations (22) to (24) (ST22):

$$\lambda_{j,\Lambda} = \prod_{l \in \Lambda \setminus \{j\}} \frac{l}{l-j} \qquad (22)$$

$$\sigma_j = s_j \cdot L^2 \cdot \lambda_{j,\Lambda} \qquad (23)$$

$$Z_j = C^{\sigma_j} (\mathrm{mod}\ N) \qquad (24)$$

The user unit U combines the partial outputs Zj received from the t shareholders Tj and computes ciphertext $M^{L^2}$ (mod N) as shown in equation (25) (ST23):

$$\prod_{j \in \Lambda} Z_j = (M^e)^{L^2 \cdot \sum_{j \in \Lambda}(s_j \lambda_{j,\Lambda})} = M^{L^2} (\mathrm{mod}\ N) \qquad (25)$$

The user unit U computes a message M from the original ciphertext $M^e$ and the ciphertext $M^{L^2}$, or two different ciphertexts ($M^{L^2}$, $M^e$), using the above-described RSA common modulus protocol failure Common ($L^2$, e)→M (ST24). The correlation between the second embodiment and the aforementioned protocol is as follows: ($M^{L^2}$, $M^e$)= ($C_1$, $C_2$) and ($L^2$, e)=(e1, e2). The RSA common modulus protocol failure has soundness as shown in equation (26):

$$C1^{a1}(C2^{a2})^{-1} = M^{L2a1-ea2} = M (\mathrm{mod}\ N) \qquad (26)$$

(Shared Signature)

The user unit U may cause t shareholders $T_Z$ to perform shared signature instead of shared decryption.

In this case, the user unit U uses data S1 (=M) to be signed in place of ciphertext C to be decrypted and the result of signature S2 (=$(M^d)^{L^2}$ (mod N) where ^ represents power) in place of the ciphertext $M^{L^2}$ obtained by decryption (ST23a).

Then, the user unit U computes signature $M_d$ from ($C_1$, $C_2$)=($M^{dL^2}$, M)=($(M^d)^{L^2}$, $(M^d)^e$) on the basis of the following RSA common modulus protocol failure (ST24a):

$$a1 = (L^2)^{-1} (\mathrm{mod}\ e)$$

$$a2 = (a1L^2 - 1)/e$$

$$M = C_1^{a1}(C_2^{a2})^{-1} (\mathrm{mod}\ N)$$

The RSA common modulus protocol failure has soundness as shown in equation (27):

$$C1^{a1}(C2^{a2})^{-1} = M^{d(L2a1-ea2)} \qquad (27)$$
$$= M^d (\mathrm{mod}\ N)$$

(Modification of Shared Signature)

Figures 12, 13:
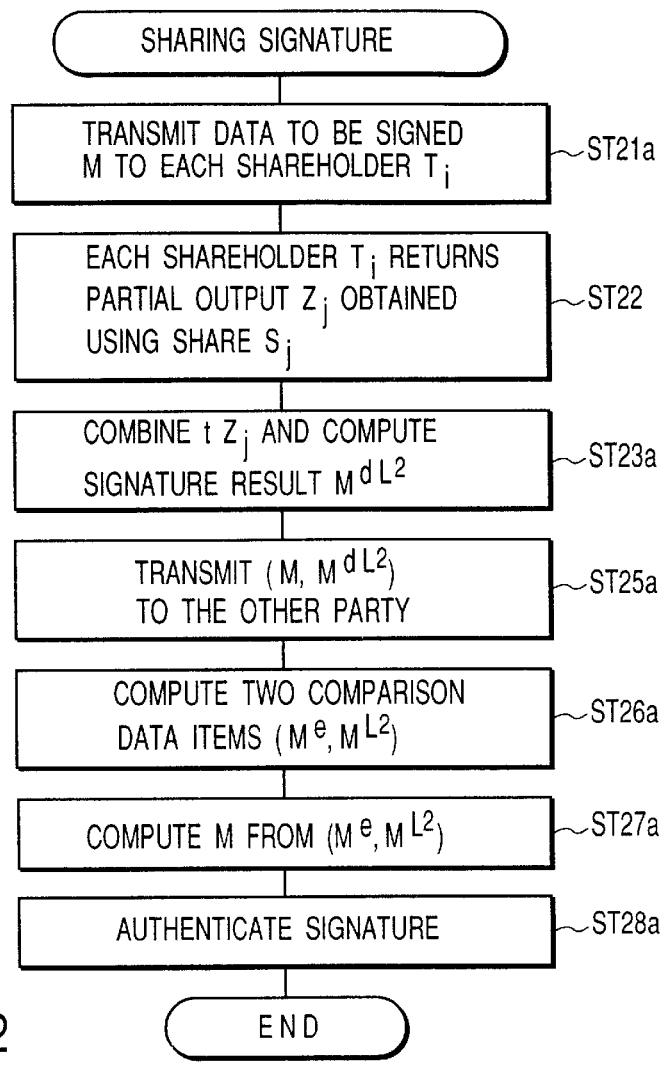
FIG. 12 is a flowchart to help explain the operation of a modification of signature in the second embodiment.
FIG. 13 is a table to help evaluate the scheme of the present invention in relation to the conventional scheme.

The above-described shared signature may be modified as shown in FIG. 12. Specifically, after step ST23a, the user unit U transmits a set of data to be signed S1 and signature result S2 to a signature authentication device at the other party (not shown) (ST25a).

The signature authentication device calculates first comparison data D1 (=$M^e$ (mod N)) from data to be signed S1 and first public key (e, N) and then second comparison data D2 (=$M^{L^2}$ (mod N)) from signature result S2 and second public key (e, N) (ST26a).

Thereafter, the signature authentication device does calculations and determines an output M on the basis of the first and second comparison data D1, D2 and the following equations (28) to (30) (ST27a):

$$a1 = (L^2)^{-1} (\mathrm{mod}\ e) \qquad (28)$$

$$a2 = (a1L^2 - 1)/e \qquad (29)$$

$$M = D_1^{a1}(D_2^{a2})^{-1} (\mathrm{mod}\ N) \quad (30)$$

If the output M coincides with the data to be signed S1, the signature authentication device judges that the signature of the user unit U is valid (ST28a).

As described above, with the second embodiment, when share sj about the secret key d have been shared to n shareholders P1 to Pn in an RSA crypto system under the condition that an RSA common modulus protocol failure is applicable, the user unit U selects t shareholders $T_Z$ and transmits encrypted data C1. Each of the t shareholders $T_Z$ returns the partial output Zj obtained by performing an operation on the encrypted data C1 (=$M^e$ (mod N)) to the user unit U. The user unit U combines t partial outputs Zj to produce the result of decryption C2 (=ML^2 (mod N)) and executes a computing process on the basis of the result of decryption C2, the data to be processed C1, and the RSA common modulus protocol failure to determine the result of final decryption M.

Therefore, any t out of n shareholders can perform shared decryption without computing the secret key in an environment where there is no dealer. In addition, high reliability can be realized on the basis of Lagrange's interpolation using a public key under specific conditions.

Furthermore, with the data to be signed C2 (=M) in place of the data to be decrypted C2 and the result of signature S1 (=$(M^d)^{L^2}$ (mod N) where ^ represents power) in place of the result of decryption C1, a signature $M^d$ is determined by performing an operation using the RSA common modulus protocol failure.

In this way, shared signature is realized as is shared decryption.

Specifically, with the second embodiment, creating a public key under specific conditions enables the decrypting and encrypting processes to be executed reliably, regardless of a combination of t shareholders.

The scheme of the second embodiment that realizes the above-described functions using a non-dealer model will be compared with the scheme of reference [FGMY97] that realizes the functions (the shared decryption/shared signature in the (t, n) type) using a dealer model.

Like the scheme of reference [FGMY97], the scheme of the second embodiment is based on the following Euclidean formula (30) using $\alpha$ and $\beta$ as coefficients:

$$e\alpha + L^2\beta = 1$$

where $\gcd(e, L^2) = 1$ where coefficients $(\alpha, \beta) = (-a2, a1)$ in the scheme of the second embodiment, and coefficients $(\alpha, \beta) = (P, s/H)$ in the scheme of reference [FGMY97].

In the second embodiment, since M is computed from the combined output using Euclidean algorithm after the partial outputs Zj have been combined in decryption, the processing efficiency is lower than that of the scheme of reference [FGMY97] by the value corresponding to the process of computing M. (In the scheme of reference [FGMY97], since a dealer creates a Euclidean formula at the time of key sharing, the partial outputs of the shareholders are combined in decryption. The combined output is message M.)

In the scheme of reference [FGMY97], however, a dealer who knows Euler's function of N $\phi(N)$ is needed and $L^2k$ fulfilling $d \equiv P + L^2k \pmod{\phi(N)}$ is shared secretly to shareholders, which share the function. When having lost the secret key d and prime factors p and q, the dealer cannot recover the secret key d from the shareholders. The reason is that, even if $L^2k$ is recovered, the secret key d cannot be calculated from $L^2k$ because modulus $\phi(N)$ is lost. $P + L^2k$ congruent to d using modulus$\phi(N)$ can be computed.

Specifically, in the scheme of reference [FGMY97], shared signature and shared decryption are performed in an environment where there is a dealer, but the dealer cannot recover the key d. In the scheme of reference [FGMY97], to recover the key, it is necessary to use another scheme, such as the scheme disclosed in a reference about a dealer model (T. P. Pedersen, "Shared provers with applications to undeniable signatures," Advances in Cryptology-Eurocrypt '91, LNCS 547, pp. 221–238, 1991, which is hereinafter referred to as reference [Ped91a]) or reference [Oka97]. When the positions of the conventional scheme and the scheme of the present invention in the shared RSA crypto system are considered, they are classified as shown in FIG. 13.

On the other hand, the scheme of the present invention can realize shared signature and shared decryption by combining with the scheme of reference [Ped91a] in an environment where there is a dealer and by combining with the scheme of reference [FMY98] in an environment where there is no dealer.

In the first and second embodiments, the case where there is no dealer has been explained. Hereinafter, modifications 1 and 2 applied to an environment where there is no dealer will be explained briefly. Modification 1 is related to a case where the first embodiment is applied to a dealer model. In modification 1, a user unit U serving as a dealer creates all the partial secret keys $d_{j,k}$ fulfilling equation (13) and allocates them to the shareholders. With modification 1, because the complex processes from step ST1 to step St4 described above are eliminated, the efficiency is improved so much more.

Modification 2 is related to a case where the second embodiment is combined with reference [Ped91a]. This combination achieves the same function as that of the combination of the second embodiment with reference [FMY98].

Specifically, as far as (t, n) secret sharing is concerned, the present invention can be realized, regardless of whether there is a dealer. The invention is not limited to the above-described embodiments. For instance, the invention may be realized by suitably using a function group concerning a case where any t of n birds are put in different birdhouses (K. Kurosawa and D. Stinson, Personal communication, June 1996 Referred in Desmedt's paper. (Y. Desmedt, "Some recent research aspects of threshold cryptography," Information Security, LNCS 1396, pp. 158–173, 1997)).

As long as the storage medium in the present invention is a computer-readable storage medium and can store programs, it may take any storage form, such as a magnetic disk, a floppy disk, a hard disk, an optical disk (e.g., CD-ROM, CD-R, or DVD), a magneto-optical disk (e.g., MO), or a semiconductor memory.

An operating system (OS) running on a computer under the control of the programs loaded into the computer from a storage medium, or middleware (MW), such as database management software or network software, may execute part of the processes to realize the embodiments.

The storage medium in the present invention is not limited to a medium independent of the computer and includes a storage medium into which the programs transmitted via a LAN or the Internet are downloaded and stored or temporarily stored.

The number of storage mediums is not restricted to one. The storage medium in the invention further includes plural storage mediums used to execute the processes in the embodiments. The configuration of each medium may take any form.

The computer in the present invention may be composed of a single personal computer or a system consisting of plural devices connected in network form and execute each process in the embodiments on the basis of the programs stored on a storage medium.

Furthermore, the computer in the invention is not limited to a personal computer and includes an arithmetic processing unit and a microcomputer classified into information processing equipment. The apparatuses and devices capable of realizing the functions of the present invention using programs are generally called a computer in the invention.

Moreover, the present invention is not restricted to the RSA crypto system and may be applied to a crypto system other than the RSA crypto system, as long as it is a crypto system based on the problem of factorization into prime factors.

The present invention may be practiced or embodied in still other ways without departing from the spirit or essential characteristic thereof.

As described above, with the present invention, it is possible to provide a (t, n) secret sharing system and a storage medium which enable any t out of n shareholders to perform shared decryption and shared signature without computing a secret key in an environment where there in no dealer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A t-of-n secret sharing system which is applied to an RSA crypto system using a public, key and a secret key d, the secret sharing system including n shareholders connected to each other via a network and a user unit and, when partial final information about said secret key d is shared to n shareholders, enables any t shareholders out of said n shareholders to create at least one of a result of decryption and a result of signature without computing said secret key d, wherein each of said n shareholders comprises means for creating said public key and said secret key d, means for holding n-out-of-n partial information di ($0 \leq i \leq n$) created based on the secret key d, means for, if smallest integer equal to or larger than logarithm of n to a base t is r, turning said partial information di into t(r+1) partial random numbers of t-of-n type and sharing r+1 out of the t(r+1) partial random numbers to the respective shareholders based on a t-ary representation of value k at the $t^j$-th digit ($0 \leq k \leq t-1, 0 \leq j \leq r$) of identification number of each of said shareholders, means for putting together n(r+1) partial random numbers shared by said shareholders for each digit $t^j$ in the t-ary representation and obtaining r+1 pieces of partial final information $d_{j,k}$, means for performing an operation on the data to be processed received from said user unit on the basis of said partial final information $d_{j,k}$ and returning the obtained partial output to said user unit, and said user unit comprises means for selecting said t shareholders and transmitting data to be processed to the selected t shareholders, and means for combining the partial outputs received from said t shareholders and obtaining said result of decryption or said result of signature, wherein the means for selecting said t shareholders further comprises:

means for providing t-ary representation of identification numbers of t shareholders, means for determining whether or not a digit of the t-ary representation meets a condition that a value, calculated by a predetermined condition, in the t-ary representation, differs for each digit in the t-ary representation for the t-shareholders, and means for selecting t shareholders which meet the condition.

2. A t-of-n secret sharing system which is applied to an RSA crypto system wherein a greatest common divisor of e and $L^2$ is 1, modulus N is common, and L=(n−1)!, using a first public key e-of-N, a secret key d, and a second public key $L^2$-of-N and the secret sharing system including n shareholders connected to each other via a network and a user unit and, when share sj about said secret key d is shared to n shareholders, enables any t shareholders out of said n shareholders to create a result of decryption without computing said secret key d, wherein each of said n shareholders comprises means for performing an operation on data $C2=M^e$ (mod N) to be decrypted received from said user unit to produce a partial output Zj and returning the partial output Zj to said user unit by using the share about the secret key and the second public key, and said user unit comprises means for selecting t shareholders out of said n shareholders and transmitting said data C2 to be decrypted to the selected t shareholders, means for combining the partial outputs Zj received from said t shareholders to obtain said result of decryption $C1=M^{L^2}$ (mod N) where ^ represents power, and means for performing an operation on the basis of said result of decryption C1, said data to be decrypted C2, and the following equations to determine a result of final decryption M by using the first and second public keys:

$a1=(L^2)^{-1}$ (mod $e$)

$a2=(a1L^2-1)/e$ $M=C1^{a1}(C2^{a2})^{-1}$ (mod $N$).

3. A t-of-n secret sharing system which is applied to an RSA crypto system wherein a greatest common divisor of e and $L^2$ is 1, modulus N is common, and L=(n−1)!, using a first public key e-of-N, a secret key d, and a second public key $L^2$-of-N and the secret sharing system including n shareholders connected to each other via a network and a user unit and, when share sj about said secret key d is shared to n shareholders, enables any t shareholders out of said n shareholders to create a result of signature without computing said secret key d, wherein each of said n shareholders comprises means for performing an operation on data S2=M to be signed received from said user unit to produce a partial output Zj and returning the partial output Zj to said user unit by using the share about the secret key and the second public key, and said user unit comprises means for selecting t shareholders out of said n shareholders and transmitting said data S2=M to be signed to the selected t shareholders, means for combining the partial outputs Zj received from said t shareholders to obtain the result of signature $S1=(M^d)^{L^2}$ (mod N) where A represents power, and means for performing an operation on the basis of said result of signature $S1=(M^d)^e$, said data to be signed $S2=(M^d)^{L^2}$, and the following equations to determine the result of final signature $M^d$ by using the first and second public keys;

$a1=(L^2)^{-1}$ (mod $e$)

$a2=(a1L^2-1)/e$ $M=S_1^{a1}(S_2^{a2})^{-1}$ (mod $N$).

4. A of-n secret sharing system which is applied to an RSA crypto system using a public key and a secret key d and the secret sharing system including n shareholders connected to each other via a network and, when partial final information about said secret key d is shared to n shareholders, enables any t shareholders out of said n shareholders to create at least one of a result of decryption and a result of signature without computing said secret key d, wherein each of said n shareholders comprises means for creating said public key and said secret key d, means for holding n-out-of-n partial information di ($0 \leq i \leq n$) created based on the secret key d, means for, if the smallest integer equal to or larger than the logarithm of n to the base t is r, turning said partial information di into t(r+1) partial random numbers of t-of-n type and sharing r+1 out of the t(r+1) partial random numbers to other shareholders on the basis of a t-ary representation of value k at the $t^j$-th digit ($0 \leq k \leq t-1, 0 \leq j \leq r$) of identification number of each of said shareholders, means for putting together n(r+1) partial random numbers shared by said other shareholders for each digit $t^j$ in the t-ary representation and obtaining r+1 pieces of partial final information $d_{j,k}$, means for performing an operation on the data to be processed, on the basis of said partial final information $d_{j,k}$, and outputting the obtained partial output, means for selecting said t shareholders and transmitting the data to be processed to the selected t shareholders, and means for combining the partial outputs from said t shareholders to obtain at least either said result of decryption or said result of signature, wherein the means for selecting said t shareholders further comprises;

means for providing t-ary representation of identification numbers of t shareholders, means for determining whether or not a digit of the t-ary representation meets condition that value, calculated by predetermined condition, in the t-ary representation differs for each digit in the t-ary representation for the t-shareholders, and means for selecting t shareholders which meet the condition.

5. A shareholder which is used in a t-of n secret sharing system which is applied to an RSA crypto system using a public key and a secret key d and the secret sharing system including n shareholders connected to each other via a network and, when partial final information about said secret key d is shared to n shareholders, enables any t shareholders out of said n shareholders to create at least one of a result of decryption and a result of signature without computing said secret key d, comprising:

means for providing a t-ary representation of identification numbers of t shareholders;

means for determining whether or not a digit of the t-ary representation meets a condition that a value, calculated by a predetermined condition, in the t-ary representation differs for each digit in the t-ary representation for the t-shareholders;

means for selecting t shareholders which meet the condition;

means for creating said public key and said secret key d;

means for holding n-out-of-n partial information di ($0 \leq i \leq n$) created based on the secret key d, means for, if the smallest integer equal to or larger than the logarithm of n to the base t is r, turning said partial information di into t(r+1) partial random numbers of the t-of-n type and sharing r+1 out of the t(r+1) partial random numbers to the respective shareholders on the basis of a t-ary representation of value k at the $t^j$-th digit ($0 \leq k \leq t-1$, $0 \leq j \leq r$) of the identification number of each of said shareholders, means for putting together n(r+1) partial random numbers shared by said other shareholders for each digit $t^j$ in the t-ary representation and obtaining r+1 pieces of partial final information $d_{j,k}$, and means for performing an operation on the data to be processed, on the basis of said partial final information $d_{j,k}$, and outputting the obtained partial output.

6. A t-of-n secret sharing method which is applied to an RSA crypto system using a public key and a secret key d and the secret sharing system including n shareholders connected to each other via a network and, when partial final information about said secret key d is shared to n shareholders, enables any t shareholders out of said n shareholders to create at least one of a result of decryption and a result of signature without computing said secret key d, said secret sharing method comprising the steps of:

providing a t-ary representation of identification numbers of t shareholders;

determining whether or not a digit of the t-ary representation meets a condition that a value, calculated by predetermined condition, in the t-ary representation differs for each digit in the t-ary representation for the t-shareholders;

selecting t shareholders which meet the condition;

causing each of said n shareholders to create said public key and said secret key d;

causing each of said n shareholders to hold n-out-of-n partial information di ($0 \leq i \leq n$) created based on the secret key d, causing each of said n shareholders to turn said partial information di into t(r+1) partial random numbers of the t-of-n type, if the smallest integer equal to or larger than the logarithm of n to the base t is r, and share r+1 out of the t(r+1) partial random numbers to other shareholders based on a t-ary representation of value k at the $t^j$-th digit ($0 \leq k \leq t-1$, $0 \leq j \leq r$) of the identification number of each of said shareholders, causing each of said n shareholders to put together n(r+1) partial random numbers shared by said other shareholders for each digit $t^j$ in the t-ary representation and obtaining r+1 pieces of partial final information $d_{j,k}$, and and causing the t shareholders selected from said n shareholders to perform an operation on the data to be processed, on the basis of said partial final information $d_{j,k}$ and output the obtained partial output.

7. The t-of-n secret sharing method according to claim 6, further comprising:

the step of combining the partial outputs from the t shareholders selected from said n shareholders and obtaining at least either said result of decryption or said result of signature.

8. A t-of-n secret sharing system which is applied to an RSA crypto system wherein a greatest common divisor of e and $L^2$ is 1, modulus N is common, and L=(n−1)!, using a first public key e-of-N, a secret key d, and a second public key $L^2$-of-N and the secret sharing system including n shareholders connected to each other via a network and, when share sj about said secret key d is shared to n shareholders, enables any t shareholders out of said n shareholders to create a result of decryption without computing said secret key d by using first and second public keys, wherein each of said n shareholders comprises means for outputting a partial output Zj obtained by performing an operation on data C2=$M^e$ (mod N) to be decrypted, said partial output Zj being computed using the following equations by using the share about the secret key and the second public key:

$$\lambda_{j,\Lambda} = \prod_{l \in \Lambda \setminus \{j\}} \frac{l}{l-j}$$

$$\sigma_j = s_j \cdot L^2 \cdot \lambda_{j,\Lambda}$$

$$Z_j = C^{\sigma_j} \pmod{N}.$$

9. The t-of-n secret sharing system according to claim 8, further comprising:

means for selecting t shareholders out of said n shareholders and transmitting said data C2 to be decrypted to the selected t shareholders;

means for combining the partial outputs Zj received from said t shareholders to obtain the result of decryption $C1=M^{dL^{\wedge}2}$ (mod N) where ^ represents power; and means for performing an operation on the basis of said result of decryption C1, said data to be processed C2, and the following equations to determine the result of final decryption M:

$a1=(L^2)^{-1}$ (mod $e$)

$a2=(a1L^2-1)/e$ $M=C1^{a1}(C2^{a2})^{-1}$ (mod $N$).

10. A t-of-n secret sharing system which is applied to an RSA crypto system wherein a greatest common divisor of e and $L^2$ is 1, modulus N is common, and L=(n−1)!, using a first public key e-of-N, a secret key d, and a second public key $L^2$-of-N and the secret sharing system including n shareholders connected to each other via a network and, when share sj about said secret key d is shared to n shareholders, enables any t shareholders out of said n shareholders to create a result of signature without computing said secret key d by using first and second public keys, wherein each of said n shareholders comprises means for outputting a partial output Zj obtained by performing an operation on data S2=M to be signed; decrypted, said partial output Zj being computed using the following equations by using the share about the secret key and the second public key:

$$\lambda_{j,\Lambda} = \prod_{l\in\Lambda\setminus\{j\}} \frac{l}{l-j}$$

$$\sigma_j = s_j \cdot L^2 \cdot \lambda_{j,\Lambda}$$

$$Z_j = C^{\sigma_j} (\text{mod } N).$$

11. The t-of-n secret sharing system according to claim 8, further comprising:

means for selecting t shareholders out of said n shareholders and transmitting said data S2 to be signed to the selected t shareholders;

means for combining the partial outputs Zk received from said t shareholders to obtain a result of signature $S1=M^{dL^{\wedge}2}$ (mod N) where ^ represents power; and means for performing an operation on the basis of said result of signature S1, said data to be processed S2, and the following equations to determine the result of final signature $M^d$:

$a1=(L^2)^{-1}$ (mod $e$)

$a2=(a1L^2-1)/e$ $M^d=S1^{a1}(S2^{a2})^{-1}$ (mod $N$).

12. A t-of-n secret sharing system which is applied to an RSA crypto system wherein a greatest common divisor of e and $L^2$ is 1, modulus N is common, and L=(n−1)!, using a first public key e-of-N, a secret key d, and a second public key $L^2$-of-N and which includes n shareholders connected to each other via a network and, when share sj about said secret key d is shared to n shareholders, enables any t shareholders out of said n shareholders to create a result of decryption without computing said secret key d said secret sharing method comprising the steps of:

causing the t shareholders selected from said n shareholder to output partial outputs Zj obtained by performing an operation on data $C2=M^e$ (mod N) to be decrypted by using the share of the secret key and the second public key;

combining the partial outputs Zj received from said t shareholders to obtain said result of decryption $C1=M^{L^{\wedge}2}$ (mod N) where ^ represents power, and performing an operation on the basis of said result of decryption C1, said data to be processed C2, and the following equations to determine the result of final decryption M by using the first and second public keys:

$a1=(L^2)^{-1}$ (mod $e$)

$a2=(a1L^2-1)/e$ $M=C1^{a1}(C2^{a2})^{-1}$ (mod $N$).

13. A t-of-n secret sharing system which is applied to an RSA crypto system wherein a greatest common divisor of e and $L^2$ is 1, modulus N is common, and L=(n−1)!, using a first public key e-of-N, a secret key d, and a second public key $L^2$-of-N and which includes n shareholders connected to each other via a network and, when share sj about said secret key d is shared to n shareholders, enables any t shareholders out of said n shareholders to create a result of signature without computing said secret key d said secret sharing method comprising the steps of:

causing the t shareholders selected from said n shareholder to output partial outputs Zj obtained by performing an operation on data S2=M to be signed by using the share of the secret key and the second public key;

combining the partial outputs Zj received from said t shareholders to obtain said result of signature $S1=M^{dL^{\wedge}2}$ (mod N) where ^ represents power, and performing an operation on the basis of said result of signature S1, said data to be signed $S2=(M^d)^{L^{\wedge}2}$, and the following equations to determine the result of final signature $M^d$ by using the first and second public keys;

$a1=(L^2)^{-1}$ (mod $e$)

$a2=(a1L^2-1)/e$ $M_d=S_1^{a1}(S_2^{a2})^{-1}$ (mod $N$).

14. A computer-readable information recording medium used in a t-of-n secret sharing system which is applied to an RSA crypto system using a public key and a secret key d and the secret sharing system includes n shareholders connected to each other via a network and, when partial final information about said secret key d is shared to n shareholders, enables any t shareholders out of said n shareholders to create at least one of a result of decryption and a result of signature without computing said secret key d, said information recording medium comprising:

means for causing said shareholders to provide a t-ary representation of identification numbers of t shareholders;

means for causing said shareholder to determine whether or not a digit of the t-ary representation meets a condition that a value, calculated by a predetermined condition, in the t-ary representation differs for each digit in the t-ary representation for the t-shareholders;

means for causing said shareholders to select t shareholders which meet the condition;

means for causing said shareholders to create said public key and said secret key d, means for causing said shareholders to hold n-out-of-n partial information di ($0 \leq i \leq n$) created based on the secret key d, means for, if the smallest integer equal to or larger than the logarithm of n to the base t is r, causing said shareholders to turn said partial information di into t(r+1) partial random numbers of the t-of-n type and sharing r+1 out of the t(r+1) partial random numbers to other shareholders based on a t-ary representation of value k at the $t^j$-th digit ($0 \leq k \leq t-1$, $0 \leq j \leq r$) of the identification number of each of said shareholders, means for causing said shareholders to put together n(r+1) partial random numbers shared by said other shareholders for each digit $t^j$ in the t-ary representation and obtaining r+1 pieces of partial final information $d_{j,k}$, and means for causing said shareholders to perform an operation on the data to be processed, on a basis of said partial final information $d_{j,k}$, and outputting the obtained partial output.

15. A computer-readable information recording medium used in a t-of-n secret sharing system which is applied to an RSA crypto system wherein a greatest common divisor of e and $L^2$ is 1, modulus N is common, and L=(n−1)!, using a first public key e-of-N, a secret key d, and a second public key $L^2$-of-N and the secret sharing system includes n shareholders connected to each other via a network and, when share sj about said secret key d is shared to n shareholders, enables any t shareholders out of said n shareholders to create a result of decryption without computing said secret key d by using first and second public keys, said information recording medium comprising:

means for outputting a partial output Zj obtained by performing an operation on data $C2=M^e$ (mod N) to be decrypted, said partial output Zj being computed using the following equations by using the share about the secret key and the second public key:

$$\lambda_{j,\Lambda} = \prod_{l \in \Lambda \setminus \{j\}} \frac{l}{l-j}$$

$$\sigma_j = s_j \cdot L^2 \cdot \lambda_{j,\Lambda}$$

$$Z_j = C^{\sigma_j} (\mod N).$$

16. A computer readable information recording medium used in a t-of-n secret sharing system which is applied to an RSA crypto system wherein a greatest common divisor of e and $L^2$ is 1, modulus N is common, and L=(n−1)!, using a first public key e-of-N, a secret key d, and a second public key $L^2$-of-N and the secret sharing system includes n shareholders connected to each other via a network and, when share sj about said secret key d is shared to n shareholders, enables any t shareholders out of said n shareholders to create a result of signature without computing said secret key d by using first and second public keys said information recording medium comprising:

means for causing said shareholders to output partial outputs Zj obtained by performing an operation on data S2=M to be signed, said partial output Zj being computed using the following equations by using the share about the secret key and the second public key:

$$\lambda_{j,\Lambda} = \prod_{l \in \Lambda \setminus \{j\}} \frac{l}{l-j}$$

$$\sigma_j = s_j \cdot L^2 \cdot \lambda_{j,\Lambda}$$

$$Z_j = C^{\sigma_j} (\mod N).$$

17. A computer-readable information recording medium used in a t-of-n secret sharing system which is applied to an RSA crypto system wherein a greatest common divisor of e and $L^2$ is 1, modulus N is common, and L=(n−1)!, using a first public key e-of-N, a secret key d, and a second public key $L^2$-of-N and the secret sharing system includes n shareholders connected to each other via a network and a user unit and, when share sj about said secret key d is shared to n shareholders, enables any t shareholders out of said n shareholders to create a result of decryption without computing said secret key d, said information recording medium comprising:

means for causing said user unit to select t shareholders out of said n shareholders and transmit data C2 to be decrypted to the selected t shareholders means for causing said user unit to combine partial outputs Zj received from said t shareholders to obtain said result of decryption $C1=M^{L^2}$ (mod N) where ^ represents power, said partial outputs being obtained by performing an operation on the data $C2=M^e$ (mod N) to be decrypted by using the share of the secret key and the second public key; and and means for causing said user unit to perform an operation on the basis of said result of decryption C1, said data to be processed C2, and the following equations to determine the result of final decryption M by using the first and second keys $$a1=(L^2)^{-1} (\mod e)$$

$$a2=(a1L^2-1)/e$$

$$M=C1^{a1}(C2^{a2})^{-1} (\mod N).$$

18. A computer-readable information recording medium used in a t-of-n secret sharing system which is applied to an RSA crypto system wherein a greatest common divisor of e and $L^2$ is 1, modulus N is common, and L=(n−1)!, using a first public key e-of-N, a secret key d, and a second public key $L^2$-of-N and the secret sharing system includes n shareholders connected to each other via a network and a user unit and, when share sj about said secret key d is shared to n shareholders, enables any t shareholders out of said n shareholders to create a result of signature without computing said secret key d, said information recording medium comprising:

means for causing said user unit to select t shareholders out of said n shareholders and transmit data S2=M to be signed to the selected t shareholders means for causing said user unit to combine partial outputs Zj received from said t shareholders to obtain said result of signature $S1=M^{dL^2}$ (mod N) where ^ represents power, said partial output $Z_j$ being obtained by performing an operation on the data S2=M to be signed by using the share of the secret key and the second public key; and means for causing said user unit to perform an operation on the basis of said result of signature $S1=(M^d)^e$, said data to be signed $S2=(M^d)^{L^2}$, and the following equations to determine the result of final signature $M^d$ by using the first and second public keys;

$a1 = (L^2)^{-1} \pmod{e}$ $a2 = (a1 L^2 - 1)/e$ $M = S_1^{a1}(S_2^{a2})^{-1} \pmod{N}$.

* * * * *

UNITED STATES PATENT AND TRADEMARK OFFICE
CERTIFICATE OF CORRECTION

PATENT NO. : 6,810,122 B1
DATED : October 26, 2004
INVENTOR(S) : Miyazaki et al.

It is certified that error appears in the above-identified patent and that said Letters Patent is hereby corrected as shown below:

Column 18,
Line 67, change "public, key" to -- public key --.

Column 20,
Line 7, change "a1=$(L^{2)-1}$" to -- a1 = $(L^2)^{-1}$ --.
Line 34, change "A" to -- ^ --.
Line 45, change "of-n" to -- t-of-n --.

Column 21,
Line 24, change "t-of n" to -- t-of-n --.

Column 22,
Line 31, change "and causing" to -- causing --.

Column 23,
Lines 31-32, change "signed; decrypted," to -- signed, --.

Column 24,
Line 2, change "d said" to -- d, said --.
Lines 4-5, change "shareholder" to -- shareholders --.
Line 31, change "d said" to -- d, said --.
Lines 33-34, change "shareholder" to -- shareholders --.
Line 48, change "$M_d=S_1^{a1}(S_2^{a2})^{-1}$" to -- $M^d=S_1^{a1}(S_2^{a2})^{-1}$ --.

Column 25,
Lines 61-62, change "keys said" to -- keys, said --.

UNITED STATES PATENT AND TRADEMARK OFFICE
CERTIFICATE OF CORRECTION

PATENT NO. : 6,810,122 B1
DATED : October 26, 2004
INVENTOR(S) : Miyazaki et al.

It is certified that error appears in the above-identified patent and that said Letters Patent is hereby corrected as shown below:

Column 26,
Line 33, change "and means" to -- means --.

Signed and Sealed this

Eleventh Day of January, 2005

JON W. DUDAS
*Director of the United States Patent and Trademark Office*